(12) United States Patent
Jeung et al.

(10) Patent No.: US 7,781,093 B2
(45) Date of Patent: Aug. 24, 2010

(54) BATTERY ASSEMBLY EMPLOYED WITH SEPARATOR OF SEALED TOP PORTION AND SECONDARY BATTERY COMPRISING THE SAME

(75) Inventors: SangHun Jeung, Seoul (KR); Hokyung Byun, Miryang-si (KR); HeeSeok Kim, Daejeon (KR); Dongsub Lee, Cheongju-si (KR); Sungjong Kim, Daejeon (KR)

(73) Assignee: LG Chem, Ltd. (KR)

( * ) Notice: Subject to any disclaimer, the term of this patent is extended or adjusted under 35 U.S.C. 154(b) by 830 days.

(21) Appl. No.: 11/608,306

(22) Filed: Dec. 8, 2006

(65) Prior Publication Data
US 2007/0154790 A1 Jul. 5, 2007

(30) Foreign Application Priority Data
Jan. 4, 2006 (KR) ............. 10-2006-0000750

(51) Int. Cl.
*H01M 2/18* (2006.01)

(52) U.S. Cl. ..................... 429/139; 429/143

(58) Field of Classification Search ............... 429/136, 429/139, 143, 247
See application file for complete search history.

(56) References Cited

FOREIGN PATENT DOCUMENTS

| JP | 05-109435 | | 4/1993 |
| JP | 07153488 A | * | 6/1995 |
| JP | 2000-090965 | | 3/2000 |
| KR | 10-2004-0042373 | | 5/2004 |

* cited by examiner

*Primary Examiner*—Gregg Cantelmo
(74) *Attorney, Agent, or Firm*—Cantor Colburn LLP

(57) ABSTRACT

Disclosed herein are an electrode assembly having separators the upper ends of which are sealed and a secondary battery including the same. The electrode assembly has a cathode/separator/anode structure that can be charged and discharged. The separators, which protrude beyond the upper ends of the electrodes, are bent in one direction, the separators are heat-treated such that the bent state of the separators is fixed, and an insulative coating layer is formed at the bent surfaces of the separators. Consequently, foreign matter is prevented from being introduced into the electrode assembly, and therefore, the safety of electrode assembly is improved.

9 Claims, 2 Drawing Sheets

BATTERY ASSEMBLY EMPLOYED WITH SEPARATOR OF SEALED TOP PORTION AND SECONDARY BATTERY COMPRISING THE SAME

FIELD OF THE INVENTION

The present invention relates to an electrode assembly having separators the upper ends of which are sealed and a secondary battery including the same, and, more particularly, to an electrode assembly having a cathode/separator/anode structure that can be charged and discharged, wherein the separators, which protrude beyond the upper ends of the electrodes, are bent in one direction, the separators are heat-treated such that the bent state of the separators is fixed, and an insulative coating layer is formed at the bent surfaces of the separators, whereby foreign matter is prevented from being introduced into the electrode assembly, and therefore, the safety of electrode assembly is improved, and a secondary battery including the same.

BACKGROUND OF THE INVENTION

A secondary battery has been widely used as a power source for mobile devices, such as mobile phones, laptop computers, video cameras, etc. Especially, a lithium secondary battery has been increasingly used since the lithium secondary battery has high operating voltage and high energy density per unit weight.

The lithium secondary battery mainly uses a lithium-based oxide as a cathode active material and a carbonaceous material as an anode active material. Based on kinds of electrolytic solution, the lithium secondary battery may be generally classified as a liquid electrolyte battery or a polymer electrolyte battery. Based on forms of used electrolyte, the lithium secondary battery may be also classified as a lithium-ion battery, a lithium-ion polymer battery, or a lithium polymer battery. Based on appearances of the battery, the lithium secondary battery may be classified as a cylindrical battery, a prismatic battery, or a pouch-shaped battery.

An electrode assembly constituting the secondary battery is constructed in a structure in which separators are disposed between cathodes and anodes. Typical examples of the electrode assembly include a jelly-roll type electrode assembly constructed in which long-sheet type electrodes and separators are wound in the sectional shape of a circle and a stacking type electrode assembly constructed in a structure in which electrodes and separators having a predetermined size are sequentially stacked one on another.

The electrode assembly with the above-stated construction has a problem in that short circuits may occur in the electrode assembly due to introduction of conductive foreign matter into the electrode assembly or dendrite growth at the anodes although the cathodes and anodes are electrically isolated from each other by the separators.

For this reason, a technology for attaching the ends of neighboring separators to each other by thermal welding (Japanese Unexamined Patent Publication No. 2000-090965 and Korean Unexamined Patent Publication No. 2004-0042373) and a technology for forming an insulation material at the periphery of separators to a thickness greater than ½ of the thickness of electrodes in a battery using lithium as an anode material (Japanese Unexamined Patent Publication No. 1993-109435) have been proposed to improve the safety of the battery. However, the above-mentioned conventional arts have the following several problems.

First, the technology for attaching the ends of neighboring separators to each other by thermal welding is accomplished by applying heat sufficient to cause the separators to be at least partially melted to the ends of electrodes. Consequently, electrode active materials may be damaged in the course of applying high heat so as to completely seal the separators. When the thermal welding operation is carried out at relatively low temperature in order to prevent the electrode active material from being damaged, it is difficult to accomplish complete sealability between the separators.

Second, the technology for forming an insulation material at the periphery of separators to a thickness greater than ½ of the thickness of electrodes is characterized in that the insulation material is dissolved in a volatile solvent, is injected to the ends of the separators, and is then dried. However, processes must be repeatedly carried out so as to form sealed parts having more than a predetermined size, and the drying process must be essentially carried out. For this reason, this technology is not regarded as an economic technology applicable to practical mass production.

Consequently, the demand of a technology for solving the problems of the above-mentioned conventional arts and preventing the occurrence of short circuits in the battery due to various factors is very high.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when an electrode assembly is constructed such that separators, which are disposed respectively between anodes and cathodes, protrude higher than the anodes and the cathodes, the protruding separators are bent in one direction, the separators are heat-treated such that the bent state of the separators is fixed, and an insulative coating layer is formed at the upper ends of the separators, thermal damage to the electrodes is minimized, and the occurrence of short circuits due to introduction of foreign matter into the electrode assembly is prevented. The present invention has been completed based on these findings.

In accordance with one aspect of the present invention, the above and other objects can be accomplished by the provision of an electrode assembly having a cathode/separator/anode structure that can be charged and discharged, wherein the separators, which protrude beyond the upper ends of the electrodes, are bent in one direction, the separators are heat-treated such that the bent state of the separators is fixed, and an insulative coating layer is formed at the bent surfaces of the separators.

Preferably, the separators protrude by a length of 1.5 mm to 3 mm from the upper ends of the electrodes. When the protruding length of the separators is too small, it is not possible for the separators to completely cover the upper ends of the electrodes with the result that it is difficult to accomplish the sealability although the separators are bent, heat-treated such that the bent state of the separators is fixed, and the insulative coating layer is formed as described above. When the protruding length of the separators is too large, on the other hand, the overlapping regions are increased with the result that the size of the electrode assembly is increased.

Preferably, the upper ends of the anodes protrude higher than those of the cathodes, and the separators protrude from the upper ends of the anodes within the above-mentioned range.

The bending of the separators is not particularly restricted so long as the separators can be bent in a direction to cover the upper ends of the electrodes disposed between the separators.

The heat-treatment fixing maintains the bent state of the separators. Preferably, the heat-treatment fixing operation is performed at a temperature above a glass transition temperature of a separator material or a temperature below a melting point of the separator material. In the conventional art, the thermal welding of the separators is carried out at high temperature sufficient to cause the separators to be at least partially melted. Consequently, the heat-treatment temperature must be higher than the melting point of the separators. According to the present invention, on the other hand, the heat-treatment fixing operation is performed at a temperature below the melting point of the separators. Consequently, the damage to electrode active materials due to application of high heat is effectively prevented.

According to circumstances, the heat-treatment fixing operation may be performed at a temperature equal to or higher than the melting point of the separators for a short period of time.

The insulative coating layer is not particularly restricted so long as the insulative coating layer is formed of an electrically insulative material that can be stably coated at the upper ends of the separators while the insulative coating layer does not affect the operation of the battery. For example, the insulative coating layer may be formed of various insulative materials, such as PP, PE, PTFE, and EPDM. These insulative materials may be used individually or in a combination of two or more.

In a preferred embodiment, the insulative coating layer may be formed by applying a molten insulation material to the bent upper ends of the separators and solidifying the molten insulation material. The addition and solidification of the molten insulation material do not need any solvent, and therefore, a drying process for removing the solvent is not necessary. Consequently, the present invention is more economical. In this case, especially preferable molten insulation material is the same polymer resin as a material for the separators. The polymer resin may be a polyolefin resin such as polyethylene or polypropylene.

Preferably, the insulative coating layer has a thickness of 1 mm to 3 mm. When the thickness of the insulative coating layer is too small, the coupling force between the insulative coating layer and the separators is decreased. When the thickness of the insulative coating layer is too large, on the other hand, the thickness of the electrode assembly is increased, and the time necessary to form the insulative coating layer is increased.

The electrode assembly according to the present invention may be constructed in various structures. For example, the electrode assembly may be a jelly-roll type electrode assembly or a stacking type electrode assembly.

The structure in which the upper ends of the separators are bent and heat-treated at specific conditions according to the present invention is a novel structure. Consequently, the present invention also provides an electrode assembly having a cathode/separator/anode structure that can be charged and discharged, wherein the separators, which protrude beyond the upper ends of the electrodes, are bent in one direction, the separators are heat-treated at a temperature in a range between the glass transition temperature of a separator material and the melting point of the separator material such that the bent state of the separators is fixed.

The construction and the heat-treatment conditions of the separators are the same as the above description.

In accordance with another aspect of the present invention, there is provided a secondary battery including an electrode assembly with the above-stated construction.

The secondary battery according to the present invention does not need an additional insulating member mounted to the upper end of the electrode assembly, which is required in general secondary batteries. Consequently, the manufacturing process of the secondary battery having this structure is simplified, and the manufacturing costs of the secondary battery having this structure are reduced.

A method of manufacturing the secondary battery using the electrode assembly is well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

Figure 1:
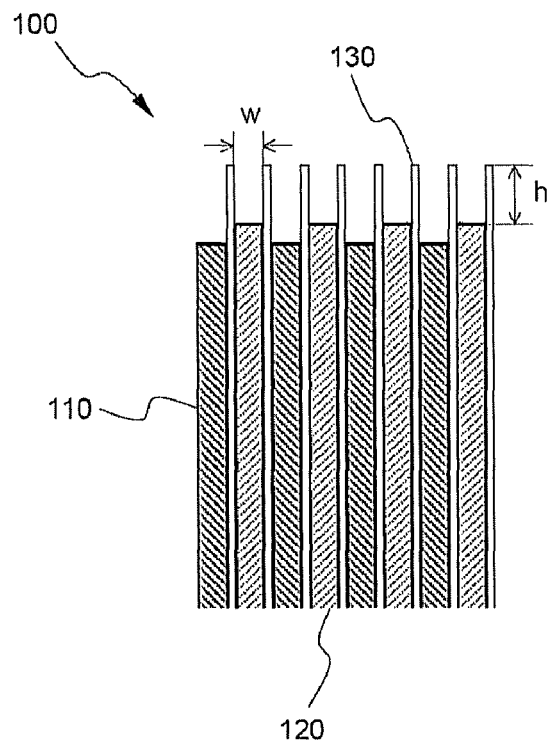
FIGS. 1 to 4 are typical views illustrating a process for manufacturing an electrode assembly according to a preferred embodiment of the present invention.

<Description of Main Reference Numerals of the Drawings>

| | |
|---|---|
| 100: electrode assembly | 110: cathodes |
| 120: anodes | 130: separators |
| 200: insulative coating layer | |

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

FIGS. 1 to 4 are typical views illustrating a process for manufacturing an electrode assembly according to a preferred embodiment of the present invention.

Figure 2:
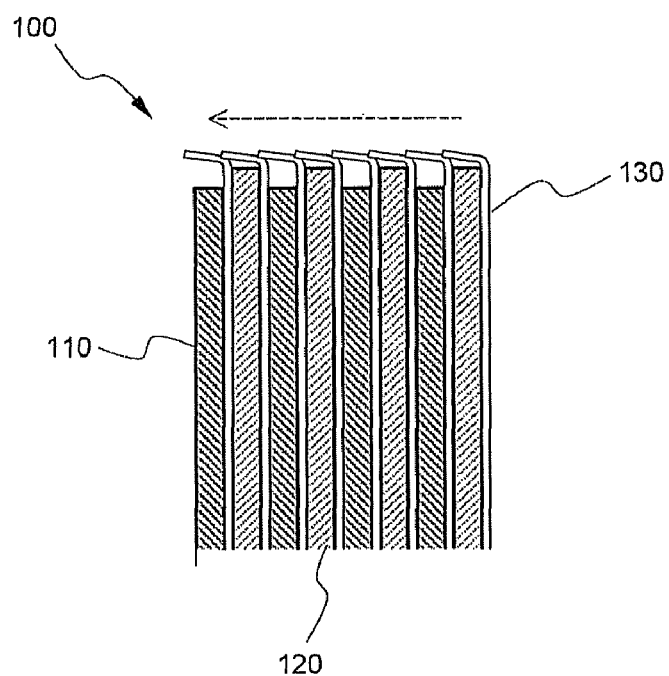

Referring first to FIG. 1, an electrode assembly 100 is constructed in a structure in which porous separators 130 are disposed respectively between cathodes 110 and anodes 120, which are prepared by applying active materials to current collectors. The cathodes 100 have a height less than that of the anodes 120, and the separators 130 have a height greater than that of the anodes 120. The protruding height h of the separators 130 is greater than the width w of the cathodes 110 and the anodes 120. Consequently, when the electrode assembly 100 is pressed in one direction, such that the electrode assembly 100 is bent, as shown in FIG. 2, the upper ends of the cathodes 110 and the anodes 120 are completely covered.

Figure 3:
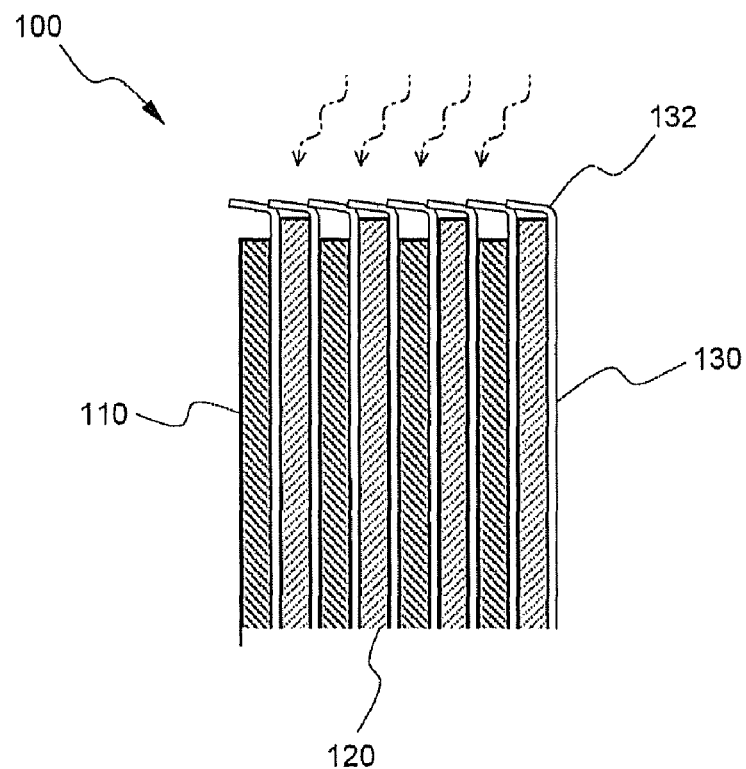

Referring now to FIG. 3, heat treatment is performed with respect to the bent portions 132 of the separators 130 covering the upper ends of the cathodes 110 and the anodes 120. The heat treatment is performed at a temperature above a glass transition temperature or a temperature below a melting point of the separators for a predetermined period of time so as to fix the bent state of the bent portions. According to circumstances, thermal welding may occur at the partial regions of the separators 130. Even in this case, however, such thermal welding is not regarded as thermal welding at the entire regions of the separators 130.

Figure 4:
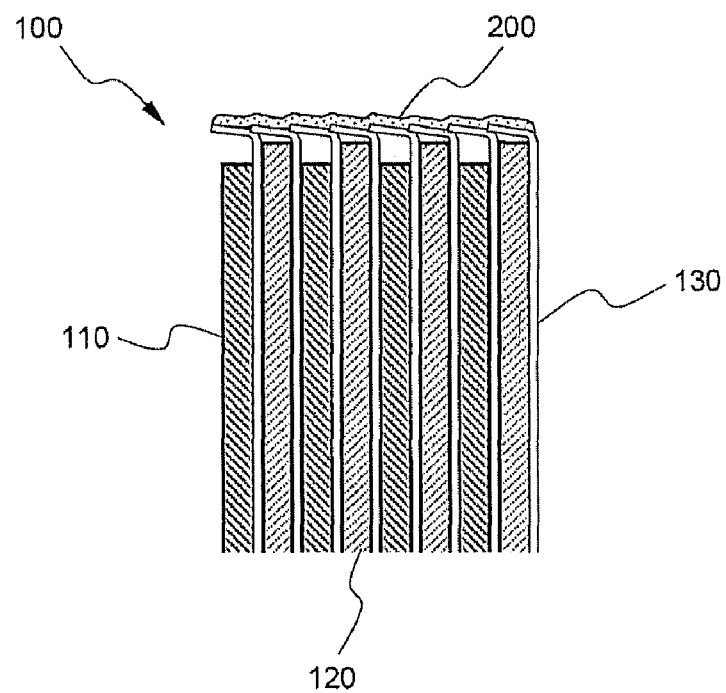

Referring finally to FIG. 4, a molten insulative resin is applied to the upper end surfaces of the thermally fixed separators 130 so as to form an insulative coating layer 200 at the upper end surfaces of the separators 130. The insulative coating layer 200 completely covers the upper ends of the cathodes 110 and the anodes 120, while interconnecting the separators 130, to prevent foreign matter from being introduced into the cathodes 110 and the anodes 120. In addition, it is possible to maintain the electrical insulation with respect to a cap plate mounted to the open upper end of a battery case (not shown) without using an additional insulation member.

Hereinafter, experiments to confirm the effects of the electrode assembly according to the preferred embodiment of the present invention will be described in detail. It should be noted, however, that the scope of the present invention is not limited by the illustrated experiments.

EXAMPLE 1

1-1. Manufacture of Cathodes

A mixture including 96 weight percent of $LiCoC_2$, 1.5 weight percent of Super-P (a conducting agent), and 2.5 weight percent of PVDF (a coupling agent), as a cathode active material, was added to NMP (N-methyl-2-pyrrolidone), as a solvent, so as to manufacture cathode mixture slurry. Subsequently, the cathode mixture slurry was applied to aluminum current collectors, which were dried and pressed. In this way, cathodes were manufactured.

1-2. Manufacture of Anodes

A mixture including 95.5 weight percent of artificial graphite, 1.5 weight percent of Super-P (a conducting agent), and 3 weight percent of PVDF (a coupling agent), as an anode active material, was added to NMP, as a solvent, so as to manufacture anode mixture slurry. Subsequently, the anode mixture slurry was applied to copper current collectors, which were dried and pressed. In this way, anodes were manufactured.

1-3. Manufacture of Electrolytic Solution

An electrolytic solution was manufactured using 1M $LiPF_6$ and an EC/PC/DMC-based solution.

1-4. Formation of Insulative Coating Layer and Manufacture of Battery

Porous separators were disposed respectively between the cathodes manufactured as described in Paragraph 1-1 and the anodes manufactured as described in Paragraph 1-2, and the separators were bent in one direction as shown in FIGS. 2 to 4. Subsequently, the separators were heat-treated at a temperature of approximately 120° C. for 3 seconds so as to fix the bent state of the separators. Afterwards, molten polypropylene, as an insulation material, was applied to the upper ends of the separators so as to form an insulative coating layer having a thickness of approximately 2 mm.

The electrolytic solution manufactured as described in Paragraph 1-3 was injected into the prepared electrode assembly. In this way, a lithium secondary battery was manufactured.

Comparative Example 1

A secondary battery was manufactured in the same manner as Example 1 except that no insulation material was applied to the upper ends of the separators.

Experimental Example 1

The batteries manufactured as described in Example 1 and Comparative example 1 were dropped from a height of 4 feet with the top, the bottom, and the side thereof down 15 times each so as to measure whether foreign matter was introduced into the electrode assemblies. The measurement results are indicated in Table 1.

TABLE 1

| Code name | Type | Size of Foreign matter | Quantity of Sample | Results |
| --- | --- | --- | --- | --- |
| Comparative example | A | Chip | 10 | Introduction of Foreign matter |
|  | B | Powder | 10 | Introduction of Foreign matter |
| Example | A | Chip | 10 | Nonintroduction of Foreign matter |
|  | B | Powder | 10 | Nonintroduction of Foreign matter |

* Chip size: ≧ 500 μm, Powder size: 44 to 150 μm

It can be seen from Table 1 that, when the insulation material was injected to the protruding upper ends of the separators such that the protruding upper ends of the separators were coated with the insulation material, the introduction of foreign matter into the corresponding electrode assembly was prevented, whereby the stability of the corresponding battery was improved.

Experimental Example 2

10-time cycle tests were carried out for the batteries manufactured as described in Example 1 and Comparative example 1 under the conditions of charge-4.3V/0.5C/3V cut-off so as to measure whether foreign matter was introduced into the electrode assemblies. The measurement results are indicated in Table 2.

TABLE 2

| Code name | Type | Size of Foreign matter | Quantity of Sample | Results |
| --- | --- | --- | --- | --- |
| Comparative example | A | Chip | 10 | Introduction of Foreign matter |
|  | B | Powder | 10 | Introduction of Foreign matter |
| Example | A | Chip | 10 | Nonintroduction of Foreign matter |
|  | B | Powder | 10 | Nonintroduction of Foreign matter |

It can be seen from Table 2 that, when the insulation material was injected to the protruding upper ends of the separators such that the protruding upper ends of the separators were coated with the insulation material, the introduction of foreign matter into the corresponding electrode assembly was prevented, whereby the stability of the corresponding battery was improved.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention has the effect of preventing foreign matter from being introduced into the electrode assembly, preventing the occurrence of short circuits in the electrode assembly, and protecting the electrode assembly from vibrations or impacts continuously applied from the outside, thereby improving the safety of a battery including the electrode assembly.

What is claimed is:

1. An electrode assembly having a cathode/separator/anode structure that can be charged and discharged,
   wherein separators, which protrude beyond upper ends of cathode and anode electrodes, are bent in one direction, the separators are heat-treated such that the bent state of the separators is fixed, and an insulative coating layer is formed at the bent surfaces of the separators.

2. The electrode assembly according to claim 1, wherein the separators protrude by a length of 1.5 mm to 3 mm from the upper ends of the electrodes.

3. The electrode assembly according to claim 2, wherein the upper ends of the anodes protrude higher than those of the cathodes, and the separators protrude from the upper ends of the anodes.

4. The electrode assembly according to claim 1, wherein the heat-treatment fixing operation is performed at a temperature above a glass transition temperature of a separator material or a temperature below a melting point of the separator material.

5. The electrode assembly according to claim 1, wherein the insulative coating layer is formed by applying a molten insulation material to the bent upper ends of the separators and solidifying the molten insulation material.

6. The electrode assembly according to claim 5, wherein the molten insulation material is a polyolefin resin being the same polymer resin as a material for the separators.

7. The electrode assembly according to claim 1, wherein the coating layer has a thickness of 1 mm to 3 mm.

8. The electrode assembly according to claim 1, wherein the electrode assembly is a jelly-roll electrode assembly or a stacking electrode assembly.

9. A secondary battery including an electrode assembly according to claim 1.

* * * * *